Jan. 15, 1957 D. G. UNTHANK 2,777,581
APPARATUS FOR SEPARATING OIL AND WATER
Filed Jan. 7, 1954

INVENTOR
Douglas G. Unthank
BY
Ralph B. Stewart
ATTORNEY 2,777,581
Patented Jan. 15, 1957

UNITED STATES PATENT OFFICE 2,777,581

APPARATUS FOR SEPARATING OIL AND WATER

Douglas G. Unthank, London, England, assignor of one-half to Henry Arthur John Silley, London, England Application January 7, 1954, Serial No. 402,741

Claims priority, application Great Britain January 9, 1953

3 Claims. (Cl. 210—61)

This invention relates to apparatus for separating oil and water and of the kind comprising a closed container provided within its interior with three conduits disposed one within the other to provide a passage through which liquid passing through the container is caused to flow and to change direction abruptly at least twice, with the separator in its operating position the innermost conduit leading to an outlet port at or near the upper end of the container for liquid from the container, the middle conduit being in sealing engagement with the lower end of the container and at least part of the outermost conduit surrounding part of the middle conduit, the container also being provided with a perforated baffle disposed in the passage formed between the container inner wall and the outermost conduit, the outermost conduit extending through an aperture in the baffle.

Such a separator is disclosed for example in U. S. patent to Unthank et al. 2,361,577, the persent invention being an improvement upon this type of separator.

Such separators are usually of steel and are subject to corrosion by the action of the oil and the water, more especially by the oil and by solid residues and scales deposited in the container. The interior of the separator must therefore be accessible for inspection, and it is the object of the present invention to provide a separator as specified above with which the interior can be inspected more readily than with such separators proposed hitherto.

According to this invention, apparatus for the separation of oil and water and of the kind specified above comprises a closed container separable into upper and lower casing parts, the said perforated baffle being mounted on the inner wall of the said lower part and extending into the said supper part when the container parts are together, the said three conduits being mounted on the said upper part and being movable relative to said perforated baffle upon separation of the two parts, and when the parts are together, the said middle conduit engaging with sealing means which are provided at the said lower end of the lower part, which are adapted to permit the said movement of the conduits and which seal the join between the said lower end and the adjacent end of the middle conduit.

Figure 1:
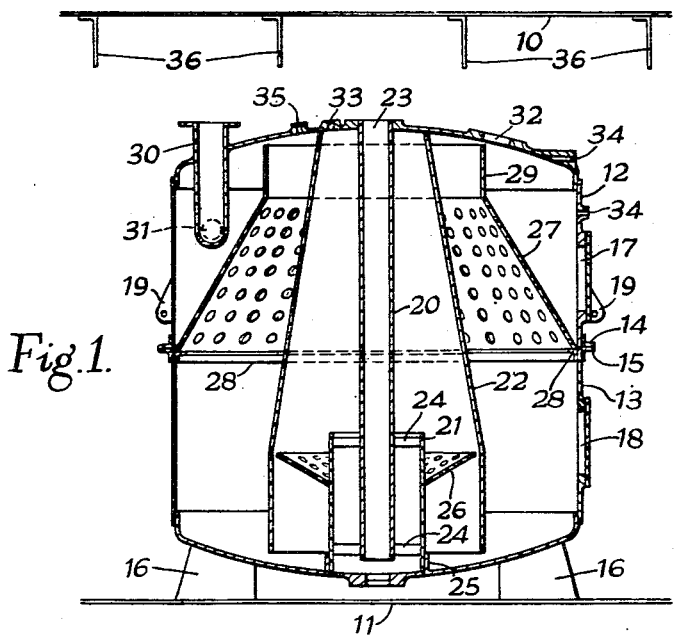
Figure 2:
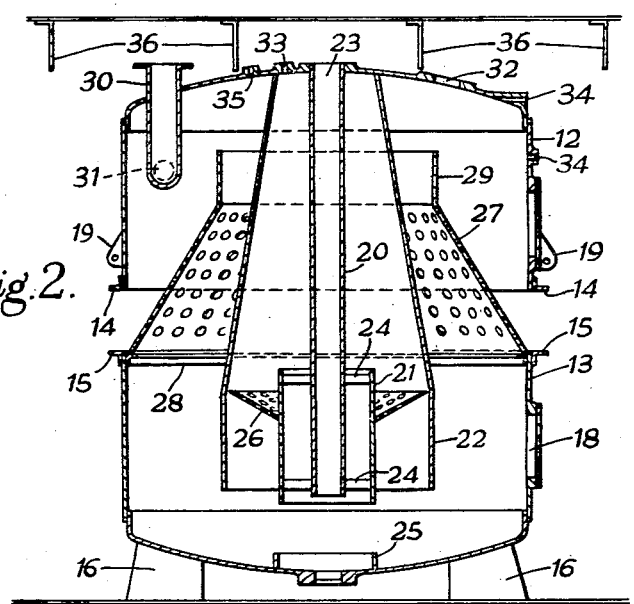

An embodiment of the invention will now be described by way of example, with reference to the accompanying drawing wherein:

Figures 1 and 2 are like axial sections through the apparatus, showing respectively the container parts together for operation and separated for inspection, the apparatus being shown as mounted, for example, between two decks of a ship.

The closed container is mounted between two decks 10 and 11, is of cylindrical shape and is formed from upper and lower cup-shaped parts 12 and 13 respectively, placed mouth to mouth and fastened together by bolts, etc., passing through co-operating flanges 14 and 15 respectively provided around the abutting circular edges of the parts. When the container is in its operating position the axis of the cylinder is vertical; thus the container is separable into its two parts in a plane which is horizontal. Each part is formed from a cylindrical side wall member fastened, e. g. by welding, to a dished end member having its concave side facing into the container interior. The convex side of the end member of the loer part 13 is provided with feet 16 by which the container is mounted on the deck 11. Manholes 17 and 18 respectively are provided in the cylindrical side wall members of both parts to give access to the container interior. The upper part is provided around its outer periphery with equally-spaced lifting lugs 19 for engagement, for example, with the hook of lifting tackle used for separating the two parts.

The upper casing part 12 supports three conduits 20, 21 and 22 which are mounted coaxially relative to one another and which project into the container. The upper end of the innermost conduit 20 opens through the dished top of part 12 and forms an outlet port 23 for water from the container and the lower end thereof extends into the neighborhood of the floor formed by the end member of the lower part 13. The middle conduit 21 is in this embodiment about ⅓ of the length of the innermost conduit 20 and is mounted on the bottom end of the latter by means of two spiders 24, which are apertured to permit passage of the liquid therethrough. The lower end of the middle conduit 21 fits closely inside a short cylindrical member 25 which is fixed to the lower part floor (e. g. by welding) coaxially with the conduits. Alternatively the short cylindrical member 25 may fit closely inside the lower end of the middle conduit 21. The short cylindrical member 25 seals the join between the middle conduit and the lower part floor against the passage of liquid through the join, whilst permitting the middle conduit to move axially with the other two conduits out of the sealing engagement when the two parts of the container are separated.

The outermost conduit 22 has its upper end closed, as by being fixed to the concave surface of the end member of the upper part 12, whilst its lower end, which is of larger diameter than the said upper end, remain open and extends into the neighborhood of the lower part floor. The closed upper end of conduit 22 is provided with a port 33 for taking off oil and air. A small, annular, perforated baffle 26 of frusto-conical shape is mounted in the passage between the middle and outermost conduits, its edge of smaller diameter being fixed to the middle conduit 21 and being the edge nearer to the lower part floor, and its edge of larger diameter fitting close against the inner wall of the outermost conduit 22.

A large, annular, perforated baffle 27, also of frusto-conical shape is mounted on the lower casing part 13, its end of larger diameter resting on a circular support 28 fixed to the inner cylindrical wall of the lower casing part close to the upper edge of the lower part cylindrical member. The other end of the large baffle extends into the upper part 12 and a cylindrical, unperforated extension 29 is fixed thereto, the extension being coaxial with the conduits and its upper end extending into the neighbourhood of the upper casing part end member.

Water contaminated with oil is introduced into the container through a pipe 30 mounted on the upper part end member, the inlet port 31 to the container being arranged to direct the liquid circumferentially around the upper part of the container, below the level of the layer of oil that forms in the container. All movement of liquid in the container is comparatively slow and turbulence is avoided as far as possible. The liquid passes downwards in the passage between the container inner wall and the outer wall of the outermost conduit 22 through the perforations in the large baffle 27, the perforations causing the liquid to flow downwards in a number of separate streams. Near the bottom of the container the liquid undergoes an abrupt change of direction and travels upwards in the annular passage between the outermost and middle conduits. Movement of the liquid through the small baffle 26 converts its flow into a number of separate, upwardly moving streams. The liquid then undergoes another abrupt change of direction and moves downwards in the annular passage between the middle and innermost conduits 21 and 20 respectively. During movement of the liquid through the container the oil separates from the water and collects at the top of the container in the annular spaces around the outermost conduit and between the outermost and innermost conduits. The abrupt changes of direction, especially from upwards to downwards movement, assists the separation. The resulting uncontaminated water passes upwards through the innermost conduit 20 and out through the outlet port 23. The oil is drawn off from the top of the tank as necessary through outlet ports 32 and 33; the removal may be made automatic by fitting automatic valves actuated by oil level indicators (not shown) mounted in ports 34, the valves operating to maintain the oil level within predetermined limits. Air is released from the tank as necessary through ports 33 and 35. A heating coil (not shown) may be provided to keep oil at the top of the tank in the fluid condition.

In a separator comprising a non-separable container including the internal arrangement of conduits and baffles described above, it is found that the two points most susceptible to corrosion are the junction between the lower edge of the large baffle 27 and the inner wall of the container, and the junction between the lower end of the middle conduit 21 and the container floor. A large number of manholes spaced around the separator would be required to enable the first-mentioned junction to be fully examined. The second-mentioned junction cannot be examined at all, even by an observer entering the container, since it is shrouded by the outermost conduit 22.

With a separator in accordance with the invention axial separation of the two container parts by as little as about one foot is sufficient to enable full inspection of the container interior and also of the said two junctions. Thus, the first junction can be examined readily from outside the container, whilst the second junction, which is now between the said short cylindrical member 25 and the lower part floor, can be readily inspected since the axial separation of the container parts has moved the outermost conduit 22 out of the way and a substantial distance clear of the short cylindrical member.

The fact that such a short axial separation of the container parts is required for complete inspection makes the separators of the present invention especially suitable for use in conditions where little overhead clearance is available e. g. on a ship. For example, in a typical installation the separator is 6 feet in diameter and 7 feet in height, being mounted between decks such as 10 and 11 in a position in which the distance between the decks is about 9 feet minus the depth of the deck beams 36 of the upper deck 10. With the dimensions just specified the maximum possible axial movement is only about 11 inches, but this is sufficient to permit full inspection with a separator of the present invention.

I claim:

1. Apparatus for separating oil and water comprising a closed container formed of upper and lower casing parts separably connected together along a horizontal plane in the mid-section of the container, three conduits carried by said upper casing part within the container and disposed one within the other to provide a passage through which liquid passing through the container is caused to flow and to change direction abruptly at least twice, the upper end of said innermost conduit being connected to an outlet port for liquid formed in the said upper casing part, the middle conduit having its upper end open within the outer conduit and its lower end extending to the bottom of the container when the casing parts thereof are secured together, means closing the upper end of said outermost conduit above the upper end of said middle conduit, the lower end of the outermost conduit terminating adjacent the bottom wall of said lower casing part, sealing means carried by the end wall of said lower casing part and engaging the end portion of said middle conduit when the said upper and lower casing parts are secured together to seal the joint between the bottom wall of said lower casing part and the adjacent end of the middle conduit, the said sealing means permitting movement of the middle conduit relative to the lower casing part upon separation of the said upper and lower casing parts, a perforated baffle disposed in the section of said passage formed between the container wall and the outermost conduit, means mounting said perforated baffle on the inner wall of the said lower casing part adjacent said horizontal plane and in a position to extend into the said upper casing part when the two casing parts are secured together, and means for introducing liquid to be separated into the upper casing part above the said perforated baffle and outside of said conduits.

2. Apparatus as claimed in claim 1, wherein there is provided another perforated baffle located in the passage between the middle and outermost conduits.

3. Apparatus as claimed in claim 1, wherein the said sealing means comprise a hollow cylindrical member coaxial with the said middle conduit, having one edge portion fixed to the floor of the said lower casing part, and the other circular edge portion fitting closely in telescoping relation with the middle conduit.

References Cited in the file of this patent

UNITED STATES PATENTS

| 245,550 | Nourse | Aug. 9, 1881 |
| 381,150 | Lowden | Apr. 17, 1888 |
| 2,175,563 | Green et al. | Oct. 10, 1939 |
| 2,188,847 | Streander | Jan. 30, 1940 |
| 2,361,577 | Unthank et al. | Oct. 31, 1944 |
| 2,595,559 | Alvord | May 6, 1952 |

FOREIGN PATENTS

| 686,444 | Germany | Jan. 10, 1940 |